Patented Aug. 16, 1938

2,127,374

UNITED STATES PATENT OFFICE 2,127,374

PROCESS OF MAKING AN IRON COMPOUND OF NITROSO-BETA-NAPHTHOL

Edward R. Allen, Summit, N. J., and George Lutz, Rocky River, Ohio, assignors, by mesne assignments, to E. I. du Pont de Nemours and Company, a corporation of Delaware No Drawing. Application January 31, 1935, Serial No. 4,300

12 Claims. (Cl. 260—11)

The present invention refers to green pigments which are iron compounds of nitroso-beta-naphthol in which one atomic proportion of iron is combined with two molecular proportions of nitroso-beta-naphthol and which are characterized by a bright green color, and processes of making the same. The novel process of our invention comprises reacting with nitroso-beta-naphthol, preferably in the form of its bisulfite compound, upon a ferrous salt of a polycarboxylic or hydroxy-carboxylic acid in the proportion of at least 1 atom of iron for each two molecular proportions of nitroso-beta-naphthol.

Up to the present time iron nitroso-beta-naphthol pigments have been produced by reacting with a water soluble inorganic iron compound upon the bisulfite compound of nitroso-beta-naphthol and it has been necessary to use an amount of iron not exceeding 1 atom of iron to 3 molecules of nitroso-beta-naphthol, as when one attempted to use the theoretical amount of iron (1 atom Fe for 2 mol. N. B. N.) the products obtained consisted of the 1:3 product admixed with impurities which spoiled the color of the 1:3 product and rendered the products worthless as pigments. N. B. N. is used herein as an abbreviation for nitroso-beta-naphthol.

We have found that a product containing one atomic proportion of Fe for 2 mol. of N. B. N. which is of a bright green color and very valuable as a green pigment is obtained provided one combines with the N. B. N. an iron compound in which iron is combined with an organic carboxylic acid, which in addition to the carboxylic group —COOH contains at least one hydroxyl group —OH attached to carbon, which latter can be a part of an additional carboxylic group, and the iron is present in the ferrous state; said iron compound corresponding to the following general formula: R—(COOH)$_n$ in which "R" represents the residue of a hydroxy carboxylic acid or polycarboxylic acid, and "$n$" is an integer of 1, 2 or 3.

Acids of this type are for instance:

Oxalic acid_____COOH—COOH
Phthalic acid_____C$_6$H$_4$(COOH)$_2$
Lactic acid_____CH$_3$—CHOH—COOH
Citric acid_____C$_3$H$_4$(OH)(COOH)$_3$
Tartaric acid_____COOH—(CHOH)$_2$—COOH
Salicylic acid_____C$_6$H$_4$(OH)(COOH)
Hydroxy-naphthalene carboxylic acid_____
_____C$_{10}$H$_6$(OH)(COOH), etc.

Particularly useful are also the ferrous salts of those organic acids in which the hydroxy or second carboxylic group are in close proximity to the original carboxy group, that is to say when the acid is of the aliphatic series the two are in alpha position, such as is the case, for instance, with oxalic or lactic acid; or when the acid is of the aromatic series, the two are in ortho position, for instance ortho salicylic acid or phthalic acid.

In the process of preparing our novel pigments we preferably follow the procedure of employing the nitroso-beta-naphthol in the form of its bisulfite compound which is water soluble and we add the preformed iron salt to the aqueous solution of the bisulfite compound, avoiding the presence of free mineral acid. The mixture is then gradually neutralized, preferably with a carbonated alkali whereby the green pigment is formed and separates. This is then filtered off, washed with water to eliminate water soluble impurities, and dried if desired.

It is not necessary to use the iron salt in absolutely the stoichiometric proportions of 1 Fe to 2 N. B. N., a small excess of the iron salt can be added to the reaction mixture without detriment to the properties of the pigment. In using lesser amounts of iron lower yields are obtained.

The following is a description of how valuable green pigments were prepared according to our invention. This is given as illustrative only and not in any way as limiting our invention to the exact procedure described.

A solution of the bisulfite compound of nitroso-beta-naphthol was obtained in the well known manner from 144 parts (1 mol.) beta-naphthol.

To this solution, at a temperature of 20° C. was added a suspension of 20 parts Turkey red oil (70%) in 200 parts of water and a solution of 7.5 parts of oxalic acid (0.0593 mol.) in 200 parts of water. To this was then added a suspension of 90 parts of ferrous oxalate (0.5 mol.) in 250 parts of water. The green pigment formed and was then precipitated by adding in 10 minutes at 20° C. a solution of 248 parts of soda ash (2.25 mols) in 3800 parts of water. The temperature was then raised uniformly to 40° C. in ½ hour. The precipitated pigment was filtered and washed until the washings were neutral to red litmus.

215 parts of an intense and bright green pigment were obtained which is very useful for all pigmenting purposes where the pigment is applied in aqueous suspension or paste, such as for pigmenting paper, asbestos, latex emulsions, etc.

On analysis the pigment indicated an iron content in the proportion of substantially one atom of iron for 2 mols of N. B. N.

The pigment obtained in this manner was in brightness and strength fully equivalent to a pigment produced from iron sulfate with an amount of iron corresponding only to the ratio of 1 Fe : 3 mols N. B. N. In the latter instance, however, the yield of pigment from the same amount of N. B. N. was only 179 parts and the pigment contained an amount of iron corresponding to 1 Fe : more than 3 mols N. B. N. Our novel process allows, therefore, to obtain considerably more color value from the same amount of betanaphthol.

The use of a reasonable excess of an iron salt of the characteristics specified above does not substantially affect the pigmenting properties of the finished product as it does in processes using inorganic iron compounds where iron can only be used in the proportion of 1 Fe:3 mols N. B. N.

A pigment was, for instance, prepared in a manner similar to that described above but using 0.582 mol. of ferrous oxalate for each mol. of N. B. N. The yield from 144 parts of beta-naphthol was 239 parts of a pigment substantially equal to that produced from 0.5 mol.

Pigments entirely similar to those obtained from ferrous oxalate as described in the above example have been produced from other salts of iron with an organic carboxylic acid having at least one hydroxy group in addition to the carboxylic group. Ferrous lactate, ferrous tartrate, ferrous citrate, ferrous salicylate, ferrous phthalate and the ferrous salt of beta-hydroxy-naphthoic acid, or other aromatic hydroxy-carboxylic acids have, for instance, given very valuable pigments.

It will be understood that the organic acids which in the form of their ferrous salts are useful in our invention are either poly-carboxylic acids containing 2 or more COOH groups, such as oxalic, phthalic acids which contain 2 COOH groups, or citric acid which contains 3 COOH groups; or hydroxy-carboxylic acids which contain one or more hydroxy groups in addition to one or more COOH groups.

The results obtained with the ferrous salts of these acids are in sharp contrast with the results obtained when using the same molecular proportions of ferric salts of the same acids or ferrous and ferric salts of inorganic iron salts or salts of simple carboxylic acids.

With ferric oxalate or ferric phthalate we obtained, for instance, very weak pigments of a dirty and unsightly shade. Similarly, with ferrous acetate we obtained pigments which could not compare in shade with those obtained from the ferrous salts of hydroxy or poly carboxylic acids.

We claim:

1. The process of making a green pigment which comprises reacting with ferrous oxalate upon an aqueous solution of the bisulfite compound of nitroso-beta-naphthol in the proportion of substantially one atom of iron for each two molecular proportions of nitroso-beta-naphthol and neutralizing the reaction mixture to precipitate the pigment.

2. The process of making a green pigment which comprises reacting with ferrous salicylate upon an aqueous solution of the bisulfite compound of nitroso-beta-naphthol in the absence of mineral acid and in the proportion of at least one atom of iron for each two molecular proportions of nitroso-beta-naphthol and neutralizing the reaction mixture to precipitate the pigment.

3. The process of making a green pigment which comprises reacting with ferrous phthalate upon the bisulfite compound of nitroso-beta-naphthol in the proportion of substantially one atom of iron for each two molecular proportions of nitroso-beta-naphthol.

4. A process for producing an iron compound of nitroso-beta-naphthol comprising reacting a compound of nitroso-beta-naphthol with a substantially water-insoluble ferrous salt of an organic acid from the group consisting of hydroxy carboxylic and polycarboxylic acids, said reaction being conducted in the substantial absence of soluble iron salts.

5. A process for producing an iron compound of nitroso-beta-naphthol comprising reacting a compound of nitroso-beta-naphthol with a substantially water-insoluble ferrous salt of a hydroxy carboxylic acid in which the hydroxy group is attached to a carbon atom adjacent to the carboxy group, said reaction being conducted in the substantial absence of soluble iron salts.

6. A process for producing an iron compound of nitroso-beta-naphthol comprising reacting a compound of nitroso-beta-naphthol with a substantially water-insoluble ferrous salt of a polycarboxylic acid in which at least 2 carboxyl groups are adjacent to each other, said reaction being conducted in the substantial absence of soluble iron salts.

7. A process for producing an iron compound of nitroso-beta-naphthol comprising reacting a compound of nitroso-beta-naphthol with a substantially water-insoluble ferrous salt of an organic acid from the group consisting of hydroxy carboxylic and polycarboxylic acids, said iron salt being employed in the proportion of substantially 1 atom of iron for each 2 molecular proportions of nitroso-beta-naphthol.

8. The process of claim 4 when performed in the absence of strong mineral acid.

9. A process for producing an iron compound of nitroso-beta-naphthol comprising reacting a compound containing the unsubstituted nitroso-beta-naphthol nucleus with an aqueous solution of a substantially water-insoluble ferrous salt of an organic acid from the group consisting of hydroxy carboxylic and polycarboxylic acids, said reaction being conducted in the substantial absence of soluble iron salts.

10. A process for producing an iron compound of nitroso-beta-naphthol comprising reacting in aqueous solution and in the substantial absence of soluble iron salts a bisulfite compound of nitroso-beta-naphthol with a substantially water-insoluble ferrous salt of an organic acid from the group consisting of hydroxy carboxylic and polycarboxylic acids.

11. A process for producing a green pigment comprising reacting upon nitroso-beta-naphthol in the form of its bisulfite compound a preformed, substantially water-insoluble ferrous salt of an organic acid from the group consisting of hydroxy carboxylic and polycarboxylic acids.

12. A process for producing an iron compound of nitroso-beta-naphthol, comprising reacting in aqueous solution a compound of nitroso-beta-naphthol with a substantially water-insoluble ferrous salt of an organic acid from the group consisting of hydroxy carboxylic and polycarboxylic acids, said insoluble ferrous salt being separately prepared and added to the aqueous solution for reaction.

EDWARD R. ALLEN.
GEORGE LUTZ.